United States Patent [19]

Simon

[11] 4,313,615

[45] Feb. 2, 1982

[54] BUCKLING ANGLE CONTROL ARRANGEMENT FOR AN ARTICULATED VEHICLE

[75] Inventor: Klaus Simon, Oberschleissheim, Fed. Rep. of Germany

[73] Assignee: Man Maschinenfabrik Augsburg-Nurnberg AG, Munich, Fed. Rep. of Germany

[21] Appl. No.: 100,079

[22] Filed: Dec. 4, 1979

[30] Foreign Application Priority Data

Dec. 11, 1978 [DE] Fed. Rep. of Germany ....... 2853420

[51] Int. Cl.³ .............................................. B62D 53/06
[52] U.S. Cl. ...................................... 280/432; 180/22; 180/135; 280/446 R
[58] Field of Search ............... 280/432, 400, 403, 448, 280/419, 426, 773, 446 R; 180/135, 22

[56] References Cited

U.S. PATENT DOCUMENTS

| | | | |
|---|---|---|---|
| 2,461,212 | 2/1949 | Hanna | 280/432 |
| 3,515,235 | 6/1970 | Kamner | 180/135 |
| 4,106,792 | 8/1978 | Schultz | 280/432 |

*Primary Examiner*—John P. Silverstrim
*Attorney, Agent, or Firm*—Alan H. Levine

[57] ABSTRACT

A buckling angle control arrangement for the articulated front and trailing members of a vehicle, including an element, such as a disk or ring, pivotable about the first axis of the articulation between the vehicle members. A pushrod pivotally interconnects the pivotable element with the steering mechanism of the vehicle in such a way that the steering mechanism and pivotable element rotate in opposite directions. Two hydraulic cylinder and piston assemblies are arranged on opposite sides of the articulation axis, each assembly being between the two vehicle members. A three-position valve, for controlling hydraulic fluid flow between the two cylinder and piston assemblies, is itself controlled by an actuating member which cooperates with two cams carried by the pivotable element.

6 Claims, 6 Drawing Figures

BUCKLING ANGLE CONTROL ARRANGEMENT FOR AN ARTICULATED VEHICLE

This invention relates to a mechanical-hydraulic buckling angle control arrangement for the trailing member of an articulated vehicle, e.g., an articulated bus especially with a rear-drive trailing member. More particularly, the invention deals with such an arrangement having two hydraulic cylinder and piston assemblies which limit the buckling angle between the leading and the trailing members of the vehicle and which are controlled as a function of the steering angle at the front member of the vehicle. These cylinder and piston assemblies are arranged on either side of the pivot connection between the vehicle members in order to keep the buckling angle from being increased by the lateral thrust of the trailing member as may occur, for example, when the vehicle is negotiating turns.

In order to determine the buckling angle to suit the respective steering angle, and to transmit it to a pilot valve controlling the cylinder and piston assemblies, use is made in German printed patent application No. 24 20 203 of an electronic means. Such means, however, are ill-suited for rough handling and are exceedingly difficult to maintain considering the equipment and personnel available in normal service shops.

It is a general object of the present invention to improve the control arrangement of the category described, such that it will satisfy all technical requirements, i.e., that it will safely function over long service periods, that it will not be affected by environmental temperatures, and that it will be easy to service.

It is a more specific object of the invention to provide a control arrangement wherein an element pivotable about the pivot axis between the vehicle members is rotated, through a mechanical linkage, by the vehicle steering mechanism an amount proportional to the amount that the steering mechanism is rotated, the pivotable element being used to control the operation of the cylinder and piston assemblies which limit the buckling angle between the two vehicle members.

The invention is described more fully below with reference to the accompanying drawings, showing an illustrative embodiment, in which.

Figure 1:
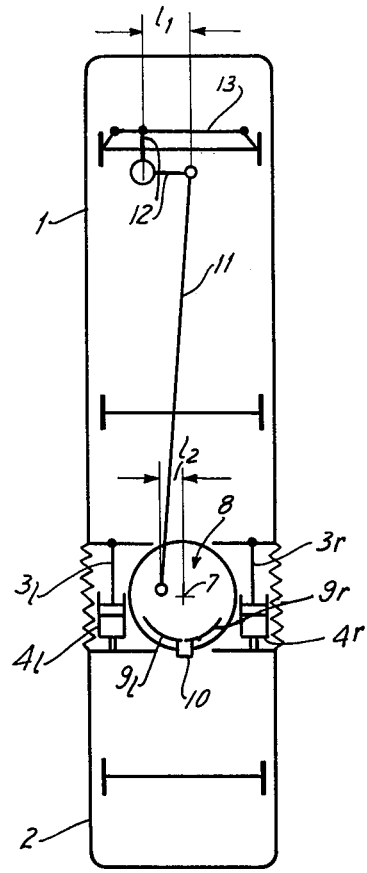
FIG. 1 is a schematic plan view illustrating an articulated vehicle incorporating the antibuckling arrangement of the present invention.

With reference now to FIG. 1, a pivot disk 8, which could be a pivot ring or merely a segment of a ring or disk, is arranged at the pivot 7 between the front member 1 and the rear member 2 of the vehicle. The pivot disk is rotated by means of a crank mechanism as a function of the steering angle and the dimensions of the cranking mechanism. For this purpose, the cranking mechanism is provided with a long pushrod 11 pivotally connected at one end, through links 12, each of a length $l_1$, to the steering rod 13. At its other end, pushrod 11 is pivotally connected to disk 8 at a distance $l_2$ from the pivot center 7. The connections at the ends of pushrod 11 are so arranged that the vehicle steering column and disk 8 rotate in opposite directions. The extent of rotation of the pivot disk sufficiently accurately corresponds to the desirable buckling angle between the leading and the trailing members of the vehicle, so that the buckling angle will be neither deficient nor excessive.

The laterally arranged cylinder and piston assemblies $3_l/4_l$ and $3_r/4_r$ between the two members of the vehicle serve to limit the buckling angle to the proper amount needed when the vehicle is negotiating turns.

For adjustment of the lengths of the cylinder and piston assemblies, use is made of the following means:

Arranged on pivot disk 8, or on the pivot ring, is a left hand actuating cam $9_l$ (FIGS. 1 and 2) and a right hand actuating cam $9_r$ located along a circular path concentric with pivot axis 7. The cams cooperate with actuating means 10, fixed to the trailing member 2 of the vehicle, which controls a three-position valve 10a. With reference now to FIG. 4 valve 10a has three connecting ports. Two connecting posts 16' and 17' lead to the right hand cylinder and piston assembly $3_r/4_r$ through lines 16 and 17, respectively, these lines containing check valves 16" and 17", respectively. The third connection port 15' leads to the left hand cylinder and piston assembly $3_l/4_l$ through a line 15.

The check valves act in opposite directions. Arranged in one of the two connecting lines of the cylinder and piston assemblies is a hydraulic vibration damping means 18 for enhancing driving stability by damping movements of the rear member. Damping means 18 may be a throttle valve which prevents the pivot angle between the vehicle members from changing too fast, i.e., faster than the angular rotational speed occurring during normal driving conditions. Arranged in a line 19 interconnecting the two cylinder and piston assemblies is an electrically actuated clear-to-reverse valve 19'. This valve opens when the vehicle is shifted into reverse, so as to short circuit the flow controlled by valve 10a when the vehicle is moving forward. As a result, free movement of the rear member 2 is permitted during backing up, since during reverse movement the ratios of steering angle to pivot angle, applicable when moving forward, do not apply.

The actuating body of the three-position valve 10a, which is illustrated to explain how it functions, and not in its production design, has a straight through passageway and a radial passageway perpendicular, and connected, to the straight through passageway. The valve is in its neutral position, illustrated in FIG. 4a, when the actuating means 10 is in its zero-position between the two actuating cams, $9_l$ and $9_r$. In this case, the two cylinder and piston assemblies are interconnected in both directions through the two line systems 15/16 and 15/17, so that the pistons are relieved of pressure. The three-position valve allows some play to give the trailing member of the vehicle some latitude for swaying movement and to provide some scope for adjustment.

Figure 2:
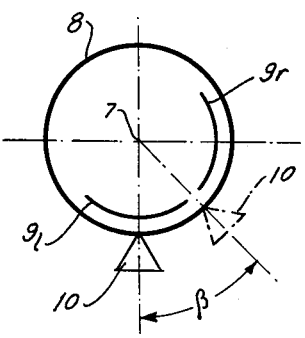
FIG. 2 illustrates the associated control element.
Figure 3:
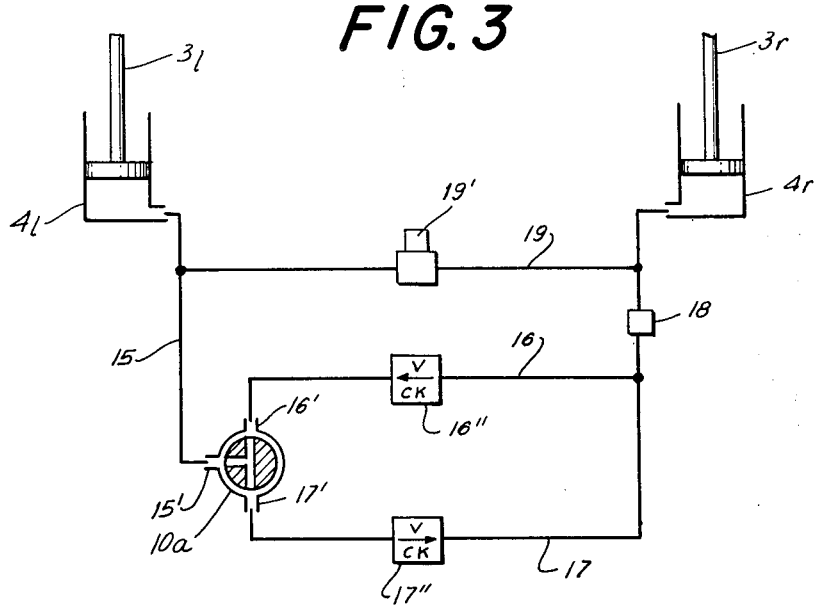
FIG. 3 illustrates the associated hydraulic circuit arrangement.
Figures 4A, 4B, 4C:
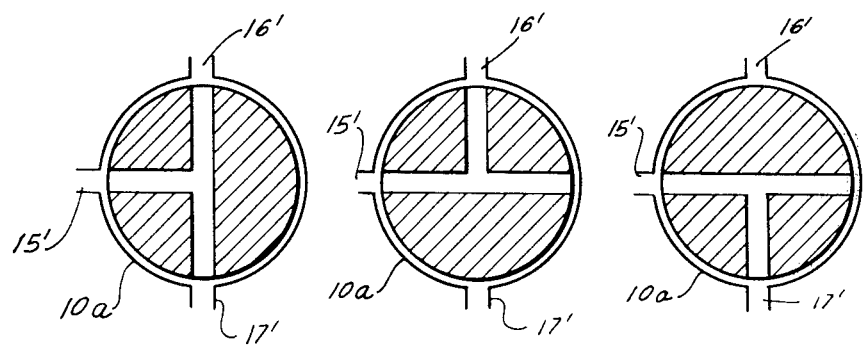
FIG. 4a is a schematic illustration, on an enlarged scale, of the three position control valve of FIG. 3 when the vehicle is traveling straight ahead.
FIG. 4b is a view similar to FIG. 4a when the vehicle is making a right hand turn.
FIG. 4c is a view similar to FIG. 4a when the vehicle is making a left-hand turn.

The valve position illustrated in FIG. 4b is present when the actuating means 10 of FIG. 2 contacts the left hand actuating cam 9 in response to the steering mechanism being turned to the right. This will open the lines 15/16. Because of the blocking action of the check valve 16", hydraulic fluid is prevented from flowing from the left hand to the right hand side, so that the cylinder and piston assembly $3_l/4_l$ cannot become shorter, keeping the trailing member from moving further out to the left hand side. Yet the hydraulic fluid is allowed to flow from the right hand to the left hand side, so that the cylinder and piston assembly $3_r/4_r$ can grow shorter; and this will allow the trailing member to move out to the right hand side until the actuating means 10 hits upon the actuating cam $9_r$. From then on, further increase in buckling angle is prevented.

FIG. 4c illustrates the position of the three-position valve 10a after a left turn has been initiated.

To further explain operation of the invention, assume that the bus is positioned straight, i.e., angle $\beta$ (FIG. 2) equals zero, and the driver wishes to make a right turn; the steering wheel is turned to the right. The linkage 12 and 11 turns pivot disk 8 to an angle which is equal to the maximum allowed buckling angle for the intended curve. Since the vehicle is still straight, the actuating means 10 is engaged by cam $9_l$, as shown in solid lines in FIG. 2. As the vehicle enters the curve, the trailing member 2 tries to turn to the right, which is possible since valve 10a is in the position shown in FIG. 4b as a result of actuating means 10 engaging cam $9_l$. Opposite movement of the rear member 2 due to centrifugal force is prevented by the presence of check valve 16.

The trailing member 2 is permitted to increase the buckling angle up to the allowed maximum angle (FIG. 2), i.e., the trailing member can pivot with respect to the front member 1 until actuating member 10 reaches the broken line position in FIG. 2. If forces on the rear member try to increase the angle beyond this limit, actuating means 10 engages cam $9_r$ causing valve 10a to switch from the position of FIG. 4b through the position of FIG. 4a to the position of FIG. 4c. Check valve 17 now prevents any attempt to increase the buckling angle. When leaving the curve, the driver turns the steering wheel back toward the left, and valve 10a assumes the position of FIG. 4c again since actuating means 10 engages cam $9_r$. Thus, an increase of the buckling angle is prevented, but a decrease is possible until actuating means 10 leaves cam $9_r$.

This explanation, for the sake of simplicity, assumes a more or less static operating sequence. However, during actual driving, steering angles, corresponding allowed buckling angles, and actual buckling angles are continuously varying.

The invention has been shown and described in preferred form only, and by way of example, and many variations may be made in the invention which will still be comprised within its spirit. It is understood, therefore, that the invention is not limited to any specific form or embodiment except insofar as such limitations are included in the appended claims.

What is claimed is:

1. A buckling angle control arrangement for the front and trailing members of a vehicle joined by an articulation having a pivot axis, the front member of the vehicle having a steering mechanism, the control arrangement comprising:

(a) an element pivotable about the pivot axis of the articulation between the vehicle members,
    (b) a linkage pivotally interconnecting said element and the steering mechanism of the front vehicle member, the linkage connection being such that the steering mechanism and pivotable element rotate in opposite directions,
    (c) two hydraulic cylinder and piston assemblies arranged on opposite sides of the articulation between the vehicle members, each assembly being between the two vehicle members, and
    (d) means responsive to the angular position of said pivotable element and the buckling angle between the vehicle members for controlling hydraulic fluid communication between said cylinder and piston assemblies to limit the buckling angle between the vehicle members.

2. A buckling angle control arrangement as defined in claim 1 wherein said responsive means (d) includes two cams carried by said pivotable element, and actuating means cooperable with said cams for controlling hydraulic fluid communication between said cylinder and piston assemblies.

3. A buckling angle control arrangement as defined in claim 2 including a three-position valve having three ports, the valve assuming its three different positions in response to said actuating means engaging one of said cams, the other of said cams, and neither cam, respectively, one of the valve ports being connected to one of the cylinder and piston assemblies, the other two valve ports being connected to the other of the cylinder and piston assemblies, and a check valve between each of the latter two valve ports and their respective cylinder and piston assembly, the two check valves permitting flow in opposite directions.

4. A buckling angle control arrangement as defined in claim 3 wherein when the vehicle is traveling straight ahead said valve responds to said actuating means by interconnecting all three of its ports, when the vehicle turns right said valve responds to said actuating means by permitting hydraulic fluid flow from the right hand cylinder and piston assembly to the left hand cylinder and piston assembly, and when the vehicle turns left said valve responds to said actuating means by permitting hydraulic fluid flow from the left hand cylinder and piston assembly to the right hand cylinder and piston assembly.

5. A buckling angle control arrangement as defined in claim 3 including a hydraulic vibration damping means in at least one of the two lines connecting two of the valve ports to said other of the cylinder and piston assemblies.

6. A buckling angle control arrangement as defined in claim 3 including a line directly interconnecting the two cylinder and piston assemblies, and a valve in said line responsive to shifting of the vehicle into reverse for providing direct fluid intercommunication between said cylinder and piston assemblies.

* * * * *